(12) United States Patent
Vanniasinkam et al.

(10) Patent No.: US 7,559,705 B2
(45) Date of Patent: Jul. 14, 2009

(54) OPTICAL ROSA FOR LONG REACH OPTICAL TRANSCEIVER

(75) Inventors: Joseph Indhiran Vanniasinkam, San Ramon, CA (US); Lijun Zhu, Dublin, CA (US)

(73) Assignee: Opnext, Inc., Eatontown, NJ (US)

( * ) Notice: Subject to any disclaimer, the term of this patent is extended or adjusted under 35 U.S.C. 154(b) by 701 days.

(21) Appl. No.: 10/764,979

(22) Filed: Jan. 26, 2004

(65) Prior Publication Data

US 2005/0163439 A1    Jul. 28, 2005

(51) Int. Cl.
*G02B 6/36* (2006.01)
(52) U.S. Cl. .............................. 385/93; 385/88; 385/90; 385/91; 385/92; 385/94
(58) Field of Classification Search .................... 385/88, 385/90–94
See application file for complete search history.

(56) References Cited

U.S. PATENT DOCUMENTS

| 5,031,984 A | * | 7/1991 | Eide et al. ...................... 385/27 |
| 5,631,991 A | * | 5/1997 | Cohen et al. ................... 385/93 |
| 5,737,467 A | * | 4/1998 | Kato et al. ..................... 385/92 |
| 6,851,870 B1 | * | 2/2005 | Deng et al. .................... 385/93 |

| 2002/0076152 A1 |   | 6/2002  | Hughes et al. |
| 2004/0159776 A1 | * | 8/2004  | Richard et al. ........... 250/214 R |
| 2004/0258369 A1 | * | 12/2004 | Luo et al. ..................... 385/93 |
| 2005/0002614 A1 | * | 1/2005  | Zhong et al. .................. 385/50 |

OTHER PUBLICATIONS

International Search Report Written Opinion dated Jun. 6, 2005, received in corresponding PCT Application No. PCT/US2005/002201.
International Preliminary Report on Patentability and Written Opinion mailed Aug. 3, 2006, in counterpart PCT Application No. PCT/US2005/002201.

* cited by examiner

*Primary Examiner*—Frank G Font
*Assistant Examiner*—Jerry Blevins
(74) *Attorney, Agent, or Firm*—Finnegan, Henderson, Farabow, Garrett & Dunner, L.L.P.

(57) ABSTRACT

A receiver optical amplifier assembly (ROSA) is disclosed that provides for greater tolerances in alignment. The ROSA includes a multimode fiber stub to receive a light beam from a single mode optical fiber. The light beam from the multimode fiber stub is focused by a lens system onto the active area of an optical detector chip. The multimode fiber stub acts as a GRIN lens and allows for optimization of the spot size on the active area. Additionally, in some embodiments the return loss characteristics of the ROSA can be greatly improved by including an angled surface on the multimode fiber stub and moving the active area of the optical detector chip off-axis to compensate.

15 Claims, 3 Drawing Sheets

OPTICAL ROSA FOR LONG REACH OPTICAL TRANSCEIVER

BACKGROUND

1. Field of the Invention

The present invention relates generally to optical communication systems and, particularly to small form factor high-speed optical transceivers with high sensitivity receivers.

2. Discussion of Related Art

There is currently a demand for high-speed, long-distance, cost-effective, and highly integrated optical transceiver systems. Therefore, optical receiver systems that are high performance, low cost, and are of small size are desired. For short reach and medium distance transmission, a PIN photo detector based receiver can be used. For long reach transceivers (e.g., for transmission over tens of kilometers), however, high sensitivity receivers are required to compensate for the optical signal loss due to long optical fibers. In long reach systems, then, an avalanche photodiode (APD) can be utilized instead of a PIN photodiode because of its higher sensitivity and lower noise characteristics.

However, the active area of a high-speed APD is generally limited in size. A typical active area diameter can be about 35 μm for a 2.5 Gb/s APD chip. These APD chips can be obtained from Mitsubishi or other manufacturers and generally include an avalanche photodiode detector and a transimpedance amplifier. In order to focus light from the signal-carrying optical fiber onto the small active area of the APD, high quality optics and tight alignment tolerances are typically used. Typically, ashperical lenses can be used to reduce optical aberrations in order to form a small spot size on the active area of the photodetector. High precision laser welding processes are often used to manufacture the receiver optical subassembly (ROSA) with a small active area APD because of the tight optical alignment tolerances. The cost of the APD-based ROSA, then, can be very high due to the intrinsic high cost of the APD, as well as the more expensive optical lenses required in the lens system and very involved assembly process.

In addition, the APD-based ROSA can be used in long reach transceivers, where requirements for low back reflection leads to a need for high return loss characteristics. In some systems, anti-reflection (AR) coatings on optical components, including optical fiber ends, lenses, and detector chip surfaces, can be used to minimize the back reflection. Therefore, there is a need for lower-cost, higher-performance optical subassemblies capable of receiving long reach optical signals.

SUMMARY

In accordance with embodiments of the present invention, a receiver optical sub assembly (ROSA) is presented that focuses received light onto a small active area, for example that of the active surface of an avalanche photo-diode (APD). Some embodiments of the resulting ROSA structure architecture, then, can achieve high sensitivity with low cost components and assembly processes.

In some embodiments, a receiver optical subassembly includes a multimode optical fiber stub and a lens system oriented with respect to the multimode optical fiber stub to focus an optical beam exiting the multimode optical fiber stub onto an active area of an optical detector chip.

A method of receiving light in a receiver optical subassembly according to some embodiments of the invention includes coupling a light beam from a single-mode optical fiber into a multimode fiber stub, and focusing the light beam onto an active area of an optical detector chip.

A method of assembling a receiver optical subassembly according to the present invention includes press-fitting a multimode fiber stub into a stub holder, positioning a split sleeve over a portion of the multimode fiber stub, press-fitting the stub holder into a receptacle, positioning a lens system in a lens cap, positioning a detector chip onto a header, mounting the lens cap to the header so that light received by the lens system is focused onto an active area of the detector chip, actively aligning the active area of the detector chip with respect to the multimode fiber stub, and positionally fixing the active area of the detector chip with respect to the multimode fiber stub.

In some embodiments of the invention, the ROSA accepts an optical beam from a single-mode optical fiber into a multimode fiber stub. The beam divergent angle and waist size are converted in the multimode fiber stub to allow the use of low-cost ball lenses in focusing. The multimode fiber stub acts as a gradient index (GRIN) lens. In some embodiments, the length of the multimode fiber stub is optimized to modify the parameters of its output beam. The optimized beam size and divergent angle can be utilizied to provide a small spot size focused on the APD active area. In some embodiments of the invention, sufficient alignment tolerances are achieved so that the use of low cost epoxy processes for assembly of the ROSA can be used to assemble the ROSA.

Further, in some embodiments a high return loss characteristic can be achieved. In some embodiments, the end surface of the fiber stub can be angle polished to eliminate or reduce the reflection from the fiber-air interface back to the fiber. The detector chip can also be positioned with an offset such that the incident beam can be incident on the APD chip at an oblique angle to minimize the amount of light reflected from the detector chip back into the optical fiber.

These and other embodiments are further discussed below with reference to the following figures.

In the figures, elements having the same designation have the same or similar function.

DETAILED DESCRIPTION

Figure 1:
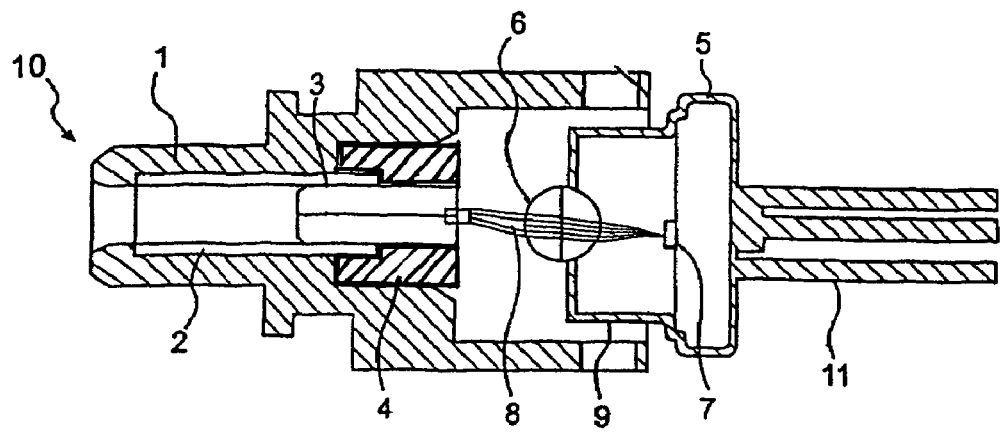
FIG. 1 shows an assembled ROSA according to some embodiments of the present invention.

FIG. 1 illustrates a cross sectional diagram of an embodiment of a receiver optical sub assembly (ROSA) 10 according to the present invention. ROSA 10 includes a multimode fiber stub 3 and a lens system 6 optically coupled to focus light onto a detector chip 7. Detector chip 7 can be any sufficiently sensitive and stable photo detector, for example an avalanche photodiode. Other examples of detectors that can be utilized, include PIN diodes. As was discussed above, an avalanche photodiode (APD) can meet high requirements in sensitivity and noise. However, an APD can have a small active area, which requires more exacting alignment tolerances of the components of ROSA 10.

In some embodiments of the invention, ROSA 10 includes a stub holder 4 that interfaces with a receptacle 1 to hold multimode fiber stub 3. In some embodiments, a portion of multimode fiber stub 3 can be pressed into stub holder 4 and stub holder 4 can be pressed into receptacle 1 such that an optical axis of multimode fiber stub 3 (i.e., the central axis along the length of the multimode fiber) is substantially aligned with an optical axis of ROSA 10. Further, a split sleeve 2 may be pressed over a portion of multimode fiber stub 3 to act as an alignment for a single-mode fiber inserted into ROSA 10, from which an optical signal is to be detected. The single-mode fiber, then, is also aligned along the optical axis of ROSA 10 with multimode fiber stub 3 in order to couple a light beam from the single-mode fiber into multimode fiber stub 3. In some embodiments, the interface between ROSA 10 and a single-mode optical fiber can be accomplished by a standard ferule type coupling.

Lens system 6, which in some embodiments can be a ball lens, is aligned to receive light from multimode fiber stub 3 and focus the light onto the active area of detector chip 7. Lens system 6 can be mounted in a lens cap 9. Lens cap 9 can be mounted on a TO header 5 such that, when TO header 5 and lens cap 9 are aligned with multimode fiber stub 3, an optical beam 8 exiting multimode fiber stub 3 is focused onto the active area of detector chip 7. Detector chip 7 can also be mounted on TO header 5. TO header 5 also includes all electrical contacts and electrical feed-throughs 11 for affecting electrical contact with detector chip 7. In some embodiments, as shown in FIG. 1, lens system 6 can be a ball lens mounted in a ball lens cap 9. Ball lens cap 9 is then mounted on TO header 5. In some embodiments, lens system 6 is positioned a short distance from surface 33 of multimode fiber stub 3, for example 1 to 2 mm. In some embodiments, the distance between lens system 6 and multimode fiber stub 3 is kept as short as possible (e.g., less than about 1 mm) in order to minimize the spot size incident on lens system 6. If lens system 6 is a ball lens, the smaller spot size reduces the amount of aberration in lens system 6.

Figure 2:
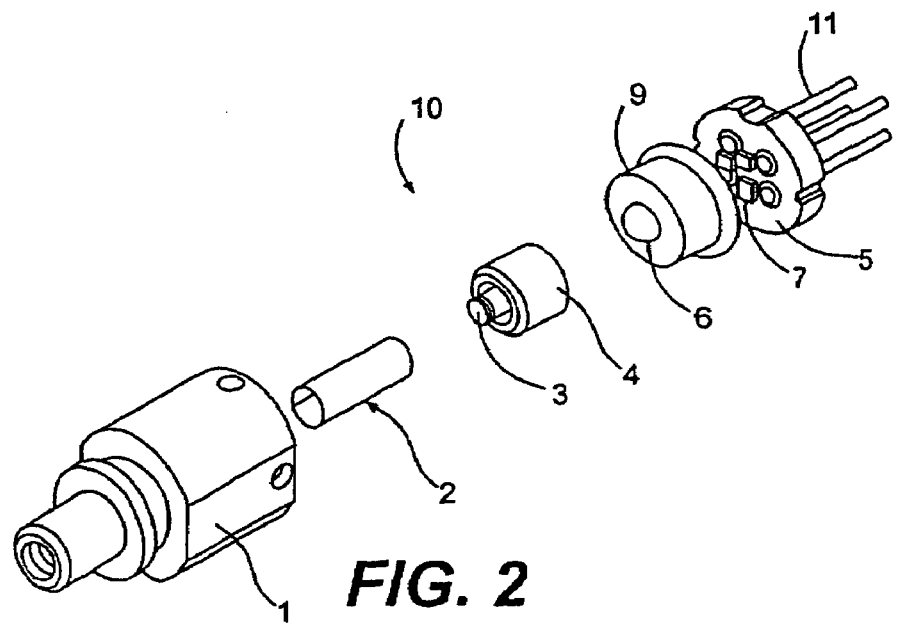
FIG. 2 shows a disassembled ROSA according to some embodiments of the present invention.

FIG. 2 illustrates an assembly view of an embodiment of ROSA 10. In the assembly process, fiber stub 3 can first be press-fit into stub holder 4. Then, split sleeve 2 is placed onto the combination of stub holder 4 and multimode fiber stub 3 and the combination can be press fit into receptacle 1. The optical axis of ROSA 10 is the axis through the center of multimode fiber stub 3 and split sleeve 2. Split sleeve 2 serves to guide single mode optical fiber inserted into ROSA 10 such that the inserted single-mode optical fiber is optically aligned along the optical axis of ROSA 10. In some embodiments, the depth of the optical plane of fiber stub 3 from the front of receptacle 1 can be determined using a gauge pin during the press fit process.

The detector package can include detector chip 7, TO header 5, and lens system cap 9 along with lens system 6. Detector chip 7, which can be an avalanche photo diode, can be mounted in an appropriate fashion on TO header 5. Further, electrical contacts are made between detector chip 7 and electrical feed-throughs 11. As is well known, a voltage can be applied to detector chip 7 and the current through detector chip 7 is monitored to indicate the presence of optical radiation incident on the active area of detector chip 7. An example electrical interface to an optical head such as ROSA 10 is disclosed in application Ser. No. 10/764,605, filed concurrently with the present disclosure, and is herein incorporated by reference in its entirety.

For an APD, the active area of detector chip 7 can be about 35 µm in diameter. In some embodiments, lens cap 9, with lens system 6 mounted within, can be placed over TO header 5 such that lens system 6 can focus light onto the active area of detector chip 7. In some embodiments, in order to reduce the return loss, the surface of multimode fiber stub 3 can be polished at an angle relative to the optical axis of ROSA 10. Therefore, the optical axis of lens system 6 can be angled with respect to the optical axis of multimode fiber stub 3. Further, the active area of detector chip 7 can be mounted off the optical axis of ROSA 10 (which coincides with the optical axis of multimode fiber stub 3), but on the optical axis of lens system 6. Lens cap 9 may be passively aligned with respect to TO header 5 by using alignment pins. In some embodiments, lens cap 9 can be epoxied to TO header 5. In some embodiments, lens cap 9 can be welded using a standard resistance welding process to header 5.

The detector package can include detector chip 7, TO header 5, and lens system cap 9 along with lens system 6. Detector chip 7, which can be an avalanche photo diode, can be mounted in an appropriate fashion on TO header 5. Further, electrical contacts are made between detector chip 7 and electrical feed-throughs 11. As is well known, a voltage can be applied to detector chip 7 and the current through detector chip 7 is monitored to indicate the presence of optical radiation incident on the active area of detector chip 7. An example electrical interface to an optical head such as ROSA 10 is disclosed in application Ser. No. 10/764,605, filed concurrently with the present disclosure, and herein incorporated by reference in its entirety.

In some embodiments, the resulting two sub-assemblies (e.g., the sub assembly including TO header 5 and lens cap 9 and the sub assembly including receptacle 1 and multimode fiber stub 3) can be assembled utilizing an active alignment process and attached utilizing a thermally cured epoxy.

Figure 5A:
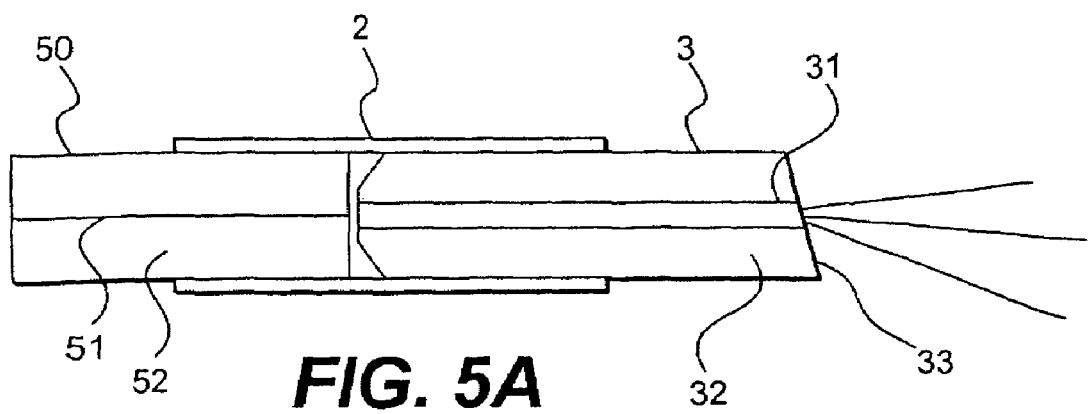
FIGS. 5A and 5B illustrate focusing of the beam from the multimode fiber stub onto the active area of an APD.

FIG. 5A illustrates optical coupling of a single mode fiber 50 to multimode fiber stub 3. In some embodiments of the invention, a standard physical contact technique for optical coupling between two optical fibers can be utilized. In that technique, the ends of both fibers can be polished in a meniscus shape and the ends are butted together to make physical contact. Split sleeve 2 can serve to align the core 51 of single-mode optical fiber 50 and core 31 multimode fiber stub 3. Typically, core 51 of single-mode optical fiber 50 has a smaller diameter than core 31 of mult-mode fiber stub 3. Further, the diameter of optical fiber 50 is substantially the same as the diameter of multimode fiber stub 3. The optical beam input from single-mode optical fiber 50 pass through multimode fiber stub 3. Because the diameter of core 31 is greater than the diameter of core 51, a larger amount of the light beam from single-mode fiber 50 can be collected into multimode fiber stub 3. In a single-mode to single-mode fiber connection, for example, about a 0.5 dB loss can be achieved. A single-mode to multimode fiber connection, however, reduces this loss to about 0.1 dB.

Figure 3:
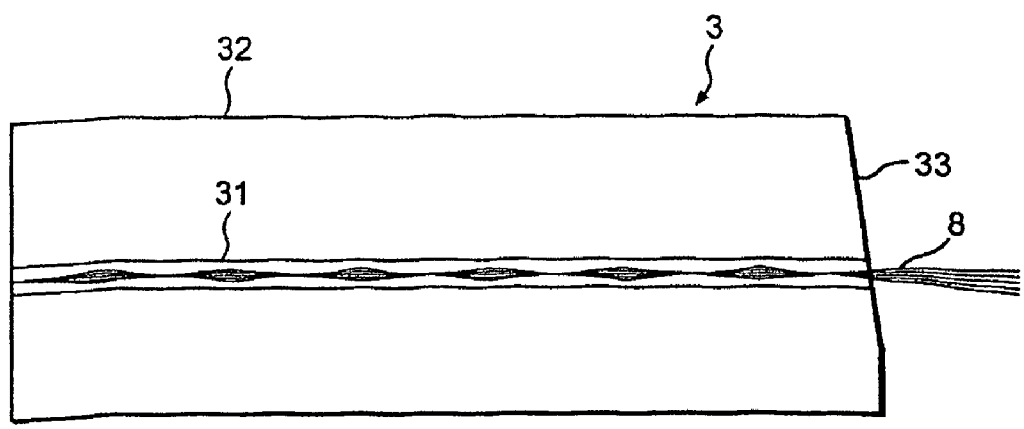
FIG. 3 shows the optical beam received from the optical fiber through a multimode fiber stub.

FIG. 3 shows a diagram of light beam 8 passing through multimode fiber stub 3 and being transmitted from multimode fiber stub 3 at surface 33. Multimode fiber stub 3 includes a core 31 surrounded by a cladding 32. Core 31 of multimode fiber stub 3, over short distances, operates on the optical beam from optical fiber 50 similarly to a gradient index (GRIN) lens. The waist size of the output beam from multimode fiber stub 3 can vary depending on the length of multimode fiber stub 3.

Figure 4:
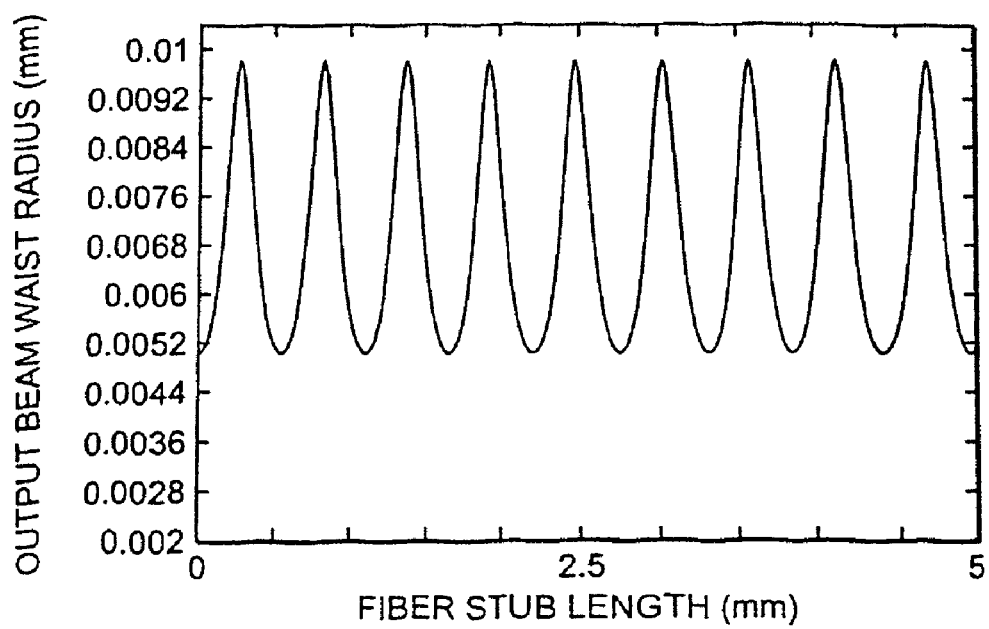
FIG. 4 illustrates the beam radius as a function of the length of the multimode fiber stub.

FIG. 4 illustrates the variation in waist size of the optical beam transmitted from multimode fiber stub 3 as a function of the length of multimode fiber stub 3. As is shown in FIG. 4, the waist size of the optical beam is a periodic function of the length of multimode fiber stub 3. The optical beam transmitted from multimode fiber stub 3 can be very close to a Gaussian profile. Therefore, in the far field angle, the beam waist size can be approximated by the relationship $$\theta = \frac{\lambda}{\pi \omega_0},$$

where θ refers to the angular width of transmitted optical beam 8 in degrees, λ is the wavelength of optical beam 8, and $\omega_0$ is the waist size of optical beam 8 at surface 33 of multimode fiber stub 3. As indicated, a larger waist size (i.e., beam diameter) results in a smaller divergent angle. Angular width θ can be used to define the numerical aperture (NA) of the multimode fiber stub 3 by the relationship NA=sin(θ). As used herein, the far field angular width is also referred to as the divergence angle.

In the particular example shown in FIG. 4, for multimode optical fiber stub 3, the beam waist radius varies from about 5 μm to about 10 μm with a periodicity in length of multimode fiber stub 3 of about 0.55 mm. Relative to the output beam of a single mode fiber, the beam waist size from multimode fiber stub 3 can be larger and the resulting divergent angle can be smaller. In many embodiments, smaller divergent angles may be preferred to obtain the optimum beam size on detector chip 7. However, the resulting larger waist sizes for the beam may also affect attainment of the optimum beam size on detector chip 7. Therefore, in some embodiments of ROSA 10, the length of multimode fiber stub 3 is chosen by balancing waist size and divergence angle in order to obtain an optimum spot size on detector chip 7.

As is also shown in FIG. 3, surface 33, where light beam 8 exits from multimode fiber stub 3, can be polished such that surface 33 is at a non-normal angle with respect to the optical axis of multimode fiber stub 3. In some embodiments, the normal to surface 33 can make an angle of approximately 8° with the optical axis. In such a system, light reflected from surface 33 in multimode fiber 3 does not travel back through multimode fiber 3 to be coupled into single-mode fiber 50. Further, light scattered back through ROSA 10 is less likely to be coupled back into single-mode fiber 50, resulting in better return loss characteristics for ROSA 10.

Figure 5B:
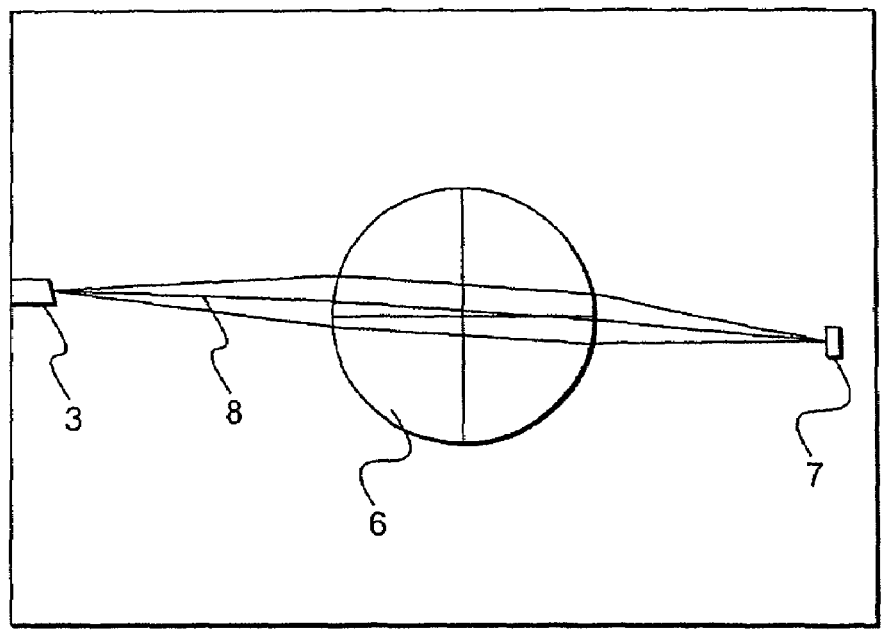

FIG. 5B illustrates an optical system between multimode fiber stub 3 and detector chip 7 where lens system 6 is a ball lens. Optical beam 8 from multimode fiber stub 3 is focused by lens system 6, which in FIG. 5B is a ball lens, onto detector chip 7, which can be an APD chip, mounted on TO header 5. As is discussed above, the spot size of beam 8 on detector chip 7 is at least in part related to the size and divergent angle of beam 8 at surface 33 of multimode fiber stub 3, the magnification of lens system 6, and the aberrations of lens system 6. When lens system 6 is a ball lens, the aberrations of the ball lens can contribute to the spot size. A small beam size through the ball lens can be important for reducing the amount of aberrations, and thus minimize the spot size of optical beam 8 on detector chip 7.

Due to the distance between surface 33 of multimode fiber stub 3 and lens system 6, which, in some embodiments of the invention, can be about 1.6 mm, the divergent angle of the beam at surface 33 can impact the amount of aberrations in a ball lens and, subsequently, the spot size on detector chip 7. A smaller beam difference angle can reduce the spot size. However, the size of the beam waist at angle 33 is inversely proportional to the divergent angle (i.e., a beam with a smaller divergent angle has a bigger waist size). For an ideal lens system, the high beam waist results in a larger spot size on detector chip 7. Therefore, there is a tradeoff between the beam size and the divergent angle. The spot size on detector chip 7, however, can be minimized by optimizing the waist size (and the divergent angle) of the beam at surface 33 of multimode fiber stub, which can be accomplished by adjusting the length of multimode stub fiber 3.

As an example, if multimode stub filter 3 is about 3.4 mm in length, the beam waist radius at surface 33 is about 7 μm. The resulting numerical aperture, NA, is about 0.09. The divergence angle corresponding to this numerical aperture contains about 99% of the energy in beam 8. Lens system 6 is a ball lens with about 1.5 mm diameter made of BK7 silica. Lens cap 7, TO header 5, and detector chip 7 can be purchased from Mistubishi. With the small beam numerical aperture, a spot size of about 15 μm in diameter at detector chip 7 can result. In some embodiments, the distance between surface 33 of multimode optical fiber 31 and ball lens 6 can be about 1.6 mm and the distance between ball lens 6 and the active surface of detector chip 7 can be about 1.3 mm.

Where detector chip 7 includes an APD detector with about a 35 μm diameter active area, the about 15 μm diameter spot size of the previous example allows a ±10 μm misalignment tolerance. This relaxed tolerance allows utilization of an epoxy process for assembly, instead of a high precision laser welding process.

As discussed above, in some embodiments of the invention surface 33 of multimode fiber stub 3 can have an angled surface, for example an 8 degree angled surface (i.e., a normal to surface 33 makes an angle of about 8° with the optical axis of multimode fiber stub 3). As a result, the reflection from the fiber-air interface at surface 33 will not be transmitted back into multimode fiber stub 3. However, due to refraction, beam 8 is tilted off the optical axis of multimode fiber stub 3. With an 8 degree angled surface, the beam can be angled from the optical axis of multimode fiber stub 3 by about 4 degrees. Therefore, light reflected from the active area of detector chip 7 is not reflected back into multimode fiber stub 3, even with a poor anti-reflective coating on the active area of detector chip 7. The combination of an angled surface 33 and offset of detector chip 7 to compensate, in combination, provides for a high return loss. No anti-reflective coating on surface 33 is required and anti-reflective coatings are not required on the active area of detector chip 7 to provide for this high return loss characteristic. Of course, in some embodiments anti-reflective coatings on surface 33 and on the active area of detector chip 7 can be provided to maximize the amount of light detected by detector chip 7.

In some embodiments, the distance between surface 33 of multimode optical fiber 31 and ball lens 6 can be about 1.6 mm and the distance between ball lens 6 and the active surface of detector chip 7 can be about 1.3 mm. Further, the optical axis of optical system 6 and the optical axis of multimode optical fiber 31 can be arranged to be parallel and separated by about 0.2 mm. The optical axis of the active surface of detector chip 7 and the optical axis of lens system 6 can also arranged to be parallel. The optical axis of the active surface of detector chip 7 is separated by about 0.18 mm from the optical axis of ball lens 6 and separated by about 0.38 from the optical axis of multimode optical fiber 31.

Other embodiments of the invention will be apparent to those skilled in the art from consideration of the specification and practice of the invention disclosed herein. It is intended that the specification and examples be considered as exemplary only, with a true scope and spirit of the invention being indicated by the following claims.

What is claimed is:

1. A receiver optical sub assembly, comprising:
a multi-mode optical fiber stub; and a lens system oriented with respect to the multi-mode optical fiber stub to focus an optical beam exiting the multi-mode optical fiber stub onto an active area of an optical detector, wherein the multi-mode fiber stub includes an exit surface, the exit surface being polished at an angle with respect to an optical axis of the multi-mode fiber stub, wherein the optical detector is offset from the optical axis of the multi-mode optical fiber.

2. The assembly of claim 1, wherein the multi-mode optical fiber stub is mounted in a stub holder, the stub holder being positioned in a receptacle.

3. The assembly of claim 2, further including a split sleeve positioned over a portion of the multi-mode optical fiber stub, the split sleeve being capable of positioning a single-mode optical fiber to optically couple with the multi-mode optical fiber stub.

4. The assembly of claim 1, wherein the lens system is mounted on a lens cap, the lens cap being mounted on a TO header so that the beam is focused on an active area of a detector mounted on the TO header.

5. The assembly of claim 1, wherein the lens system is a ball lens.

6. The assembly of claim 1, wherein the optical detector is an avalanche photo diode.

7. The assembly of claim 1, wherein the angle is about 8 degrees.

8. A method of receiving light in a receiver optical sub assembly, comprising:
coupling a light beam from a single-mode optical fiber into a multi-mode fiber stub via a sleeve, wherein the sleeve aligns the single-mode optical fiber and the-multi-mode fiber stub; and
focusing the light beam onto an active area of an optical detector.

9. The method of claim 8, further including
providing an angled exit surface on the multi-mode fiber stub; and
positioning the active area of the optical detector to compensate for the angled exit surface.

10. A receiver optical sub assembly, comprising:
a sleeve for coupling an optical fiber and a multi-mode fiber stub; wherein the sleeve aligns the optical fiber and the multi-mode fiber stub;
means for receiving a light beam into the multi-mode fiber stub; and
means for focusing the light beam onto an active area of an optical detector.

11. The receiver of claim 10, further comprising:
means for increasing the return loss characteristics of the receiver optical sub assembly.

12. A method of assembling a receiver optical sub assembly, comprising:
press fitting a multi-mode fiber stub into a stub holder;
positioning a split sleeve over a portion of the multi-mode fiber stub;
press fitting the stub holder into a receptacle;
positioning a lens system in a lens cap;
positioning a detector onto a header;
mounting the lens cap to the header so that light received by the lens system is focused onto an active area of the detector;
actively aligning the active area of the detector with respect to the multi-mode fiber stub; and
positionally fixing the active area of the detector with respect to the multi-mode fiber stub.

13. The method of claim 12, wherein positionally fixing the active area includes epoxying the header to the receptacle.

14. A receiver optical sub assembly, comprising:
a multi-mode optical fiber stub;
a lens system oriented with respect to the multi-mode optical fiber stub to focus an optical beam exiting the multi-mode optical fiber stub onto an active area of an optical detector, wherein the multi-mode optical fiber stub is mounted in a stub holder, the stub holder being positioned in a receptacle; and
a split sleeve positioned over a portion of the multi-mode optical fiber stub, the split sleeve being capable of positioning a single-mode optical fiber to optically couple with the multi-mode optical fiber stub.

15. A receiver optical sub assembly, comprising:
a multi-mode optical fiber stub; and
a lens system oriented with respect to the multi-mode optical fiber stub to focus an optical beam exiting the multi-mode optical fiber stub onto an active area of an optical detector,
wherein the optical detector is offset from the optical axis of the multi-mode optical fiber.

* * * * *